United States Patent [19]
Wesch

[11] 3,884,512
[45] May 20, 1975

[54] DEEP-WELL DRILLING ARRANGEMENT

[75] Inventor: Ludwig Wesch, Heidelberg, Germany

[73] Assignee: Mancar Trust, Vaduz, Liechtenstein

[22] Filed: Aug. 27, 1973

[21] Appl. No.: 391,557

Related U.S. Application Data

[63] Continuation of Ser. No. 147,264, May 26, 1971, abandoned.

[52] U.S. Cl.............. 285/133 R; 166/242; 285/423
[51] Int. Cl............................................. F16l 47/00
[58] Field of Search.......... 285/423, 133 R, 138, 93; 166/242; 175/320; 138/114, DIG. 2; 64/1 R; 161/178, DIG. 4

[56] References Cited
UNITED STATES PATENTS

| | | | |
|---|---|---|---|
| 1,134,930 | 4/1915 | Theriot | 285/138 X |
| 3,002,534 | 10/1961 | Noland | 138/DIG. 2 |
| 3,212,582 | 10/1965 | Brown | 166/242 |
| 3,232,640 | 2/1966 | Donkle | 285/93 |
| 3,572,392 | 3/1971 | McLarty | 285/423 |
| 3,606,403 | 9/1971 | Medney | 285/423 |

OTHER PUBLICATIONS

Ivon M. Rice, New Plastic Tubing Tried, Oil and Gas Journal; 08/11/1952 Vol. 51– No. 14, T.N. 860.039.

Primary Examiner—Dave W. Arola

[57] ABSTRACT

A deep-well drilling arrangement, comprising coaxially arranged inner and outer pipe-strings, each of which consists of a plurality of fiber glass reinforced pipe sections positively connected to each other. The individual pipe sections are reinforced in the axial direction at at least one peripheral region thereof. The longitudinal expansion of the entire arrangement when fully loaded is less than 0.95 of the radial expansion of the entire arrangement when fully loaded.

19 Claims, 7 Drawing Figures

DEEP-WELL DRILLING ARRANGEMENT

This is a Continuation, of application Ser. No. 147,264, filed on May 26, 1971 now abandoned.

BACKGROUND OF THE INVENTION

This invention relates to a deep-well drilling arrangement consisting of coaxially arranged outer and inner pipes strings, each of which consists of a plurality of pipe sections which are positively connected to each other by coupling means.

The aforedescribed deep-well drilling arrangement has generally the task of either lowering and/or transporting of liquid and/or gaseous media. The pipes of prior arrangements of this general type consist generally of steel which, as is well known, has a very high specific weight. The high specific weight of steel requires that in the very deep wells the size of the steel pipes is several times larger than the minimum requirements at the particular depth (sometimes the dimensions are three to five times as high). The load factors which determine the sizes of the steel pipes to be used constitute a combination of the internal pressure, the external pressure and the dead weight of the arrangement. Another factor to be considered is, of course, the temperature range at which the arrangement will operate. Another problem which must be considered in the design of the deep-well drilling arrangement is the type of the medium which is to be transported. For example, the medium which is being transported may be corrosive in nature, which may reduce the useful life of the pipe strands to the short time of three years, at which time certain replacements must be made. In addition, thereto, if crude oil is to be transported by the pipe string, there may result problems due to the depositing of paraffin in the pipes. For example, such deposit can cause a gradually increasing thickness of the pipe walls of the pipe strand, thereby causing an increase in the dead weight thereof.

SUMMARY OF THE INVENTION

It is a general object of this invention to provide a deep-well drilling arrangement wherein in lieu of steel pipes having positive connections there are used fiberglass reinforced pipes. The pipes can be used in deep-well drilling arrangements having a depth of at least 1000 meters and operating under internal pressures of at least 100 a.t. It has been found that the drawbacks of the deep-well drilling arrangements of the aforedescribed known types are eliminated to a great extent, when fiberglass reinforced pipe sections are used.

In the deep-well drilling arrangement of the instant invention, the individual pipe sections are known per se and consist of fiberglass reinforced material which have positive coupling means connecting the individual sections to each other. The coupling means are disposed along at least one peripheral line and bring about an axial reinforcement of the strands. The fibers forming the fiberglass reinforced pipe sections are of such dimensions and strength that the expansion in the axial direction under full load is limited to a minimum. Thus the ratio of the axial expansion of the pipe strand to the radial expansion, due to internal and external pressures, is less than 0.95, and preferably less than 0.8. A deep-well drilling arrangement of the aforedescribed type, when compared to arrangements having steel pipe sections or similar alloys, have the principal advantage of reducing considerably the dead weight of the arrangement. For example, the dead weight can be five times less than of the comparable steel pipe section arrangement. An arrangement of the aforedescribed type makes it possible for it to be used at very great depth without any difficulties. For example, the loading conditions at such great depth can be sustained if, in accordance with a further feature of this invention, the individual pipe sections and the positive coupling means thereof, are supported by a peripheral radial reinforcement means. The radial inner axial reinforcement means are reinforced by means of an underlying mat or webbing reinforcement and/or the individual pipe sections and all their positive coupling means are provided at least at one side of the peripheral radial reinforcement with a cross winding. The afore-described additional reinforcements, can consist of strands having different thicknesses. In this regard they are similar to the fiber glass strands which extend axially along the length of the pipe section. These different thicknesses of the strands may range from 8 to 120 ends of individual glas fiber threads. The different thicknesses do not bring about any substantial increase of the total dead weight of the arrangement but bring about a considerable improvement in controlling the pressure relationship that may be present at such great depths.

Ultimately or additionally to the aforedescribed reinforcements consisting of fibers, mats or webbing, there can be provided, in addition to the main feature of the invention for the aforedescribed deep-well arrangement, axial reinforcements which consist of at least one layer of a filler material resin mixture in each pipe section and in all of the positive coupling means. These additional reinforcements will bring about an increase in the external pressure resistance of the arrangement. The aforementioned filler material-resin mixture can consist of a mixture of sand having a grain size preferably ranging between 0.8 and 2 mm and amounting to 70 percent by weight of the mixture. The resin to be used in the mixture must be carefully selected. One has to take care that the resin selected for the mixture can be easily combined with the basic resin used in the individual pipe sections. Thus, there is preferably used for the individual pipe sections epoxy resin of low viscosity with which, for example, there are mixed 100 parts by weight with 100 parts by weight of a hardener, such as for example, tetrahydrophtal acid anhydride and 1.5 part per weight of an accelerator, such as for example, tridimethylaminomethylphenol. Further basic resins for the individual pipe sections can consist of unsaturated polyester resins, methacrylate-resins, phenol resin, furan resin, melamine resin, silicone resin, copolymerisate of butadiene-styrol with vinyltoluol and others as well as epoxydated resin of butadienestyrol with vinyltoluol can be used. Also resins having a base of polyester-bisphenol-A-fumarate can be used. In lieu of anhydride-hardeners there can be used other amino-hardeners as well as those hardeners which are suitable for epoxy-resins.

It has also been found advantageous to cover the individual pipe sections with an organic or inorganic liner at the inside surface as well as at the outside surface. This liner can consist of synthetic rubber or alternatively, materials can be used consisting of polyvinylchloride or polyethylene.

It has also been found advantageous to have the wall thicknesses of the individual pipe sections and their positive coupling means progressively reduced from the top towards the bottom of the pipe string. In this progressive reduction of the wall thicknesses it is, of course, understood that there takes place a progressive reduction of the axial reinforcement and other reinforcements. It has been found that the individual pipe sections, forming part of the arrangement of this invention, should not be of undue large length because of technical reasons, and that the individual positive coupling means should preferably take the form of bolted or screw connections. Thus the end of the individual pipe sections may be provided with an exterior threaded portion so that an internally threaded connection sleeve can be screwed on the individual pipe sections. Alternatively, the ends of the individual pipe sections may be tulip-shaped and be provided with an internal thread adopted to receive an externally threaded internal connecting sleeve, which is preferably provided at both of its ends with flange portions so that a sealing ring may be disposed between these portions. Such an externally threaded connecting sleeve can also be provided with an axial middle flange, so that a plurality of sealing rings can be mounted between the individual pipe sections. The individual sealing rings are, of course, of the high pressure-resistant-type.

In those deep-well drilling arrangement, which are permanently installed, it is recommended that the exterior walls of the exterior pipe section be covered with sand. If the exterior pipe sections are those covered with sand they are suitable for being cemented into place. This cementing in place can be carried out by introducing the cement mixture in the annular space between the exterior pipe section and the interior pipe section. The cement mixture can be transported by means of a rinsing liquid under pressure. The sand layer on the exterior surface of the exterior pipe section also favors the cementing into place by means of the cement mixture.

According to a third feature of this invention, the inner pipe section can be formed as a double wall pipe. The outer wall of this double wall pipe can be at least partly radially outwardly flexible so that the exterior wall of the double wall section can be radially spaced from the inner wall of the double wall pipe section and be placed in contact with the outer pipe section. In the region below the contacting of the outer wall of the double-walled inner pipe section with the inner surface of the outer pipe section, there is provided a region wherein the inner and outer walls of the double wall inner pipe section are air-tightly connected to each other. In such embodiment the outer wall of the double-walled inner pipe is in that region wherein the outer wall is formed of elastic material, formed as an elastomeric hose. If the inner pipe section is formed in in such a way, the possibility exists of simply checking the entire deep-well drilling arrangement for leaks during the installation and also during the operation thereof. Furthermore, the possibility exists of securing the double-walled inner pipe section against leakage during the operation of the arrangement. Thus it is possible to check the entire arrangement against leakage by simply placing the annular space between the two walls of the inner pipes section under air pressure, which results in the outer wall of the double-walled pipe section to be stretched so that it seals the annular space between the outer and inner pipe sections of the arrangement in an axial direction. After the deep-well drilling arrangement has been thus sealed one can, by controlling the pressure conditions in the aforementioned annular space, check the entire system for leakages. The individual elastic sections of the outer wall of the double-walled inner pipe sections are preferably located at the level of the positive connections between the individual inner pipe sections. The connections between the hose sections can take the form of welded connections.

If the elastic hose is formed, as described above, it can surround the inner walls of the double-walled inner pipe sections along their entire length. If the elastic hose is thus formed, it is necessary that at the connecting points of the individual inner pipe sections the elastic hose is thinner than in the other regions. Alternatively, it is also possible that the outer walls are formed, in those regions where they are not to form a seal, out of inelastic material, which provides the advantage of effecting a more secure air-seal between the outer wall of the double-walled inner pipe section and the outer pipe section.

BRIEF DESCRIPTION OF THE DRAWING

Other objects and advantages will become more apparent to those skilled in the art upon careful consideration of the following detailed description of the invention taken in conjunction with the accompanying drawings, in which.

DETAILED DESCRIPTION

Figure 1:
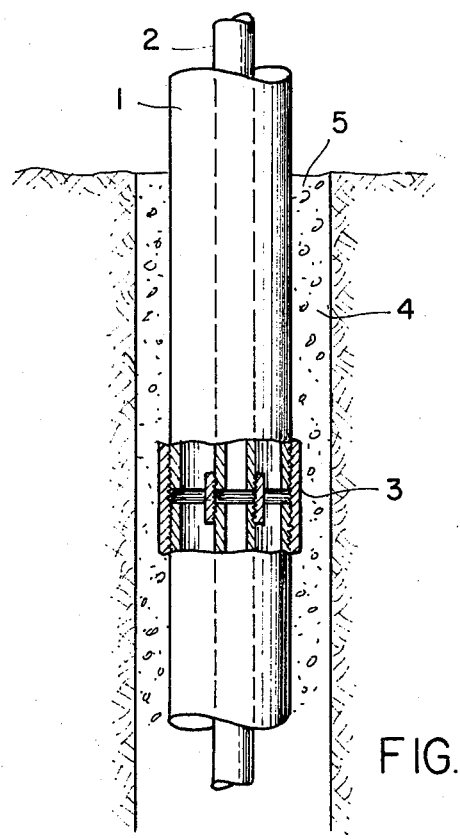
FIG. 1 is a schematic side elevational view of a portion of a deep-well drilling arrangement in accordance with the invention as installed in the ground.

Referring now to the drawing, FIG. 1 is a longitudinal section showing schematically a portion of a deep-well drilling arrangement in accordance with the arrangement of this invention. An interior pipe string 2 is coaxially arranged with respect to an interior pipe strandestring 1 disposed in a bore hole 5. Both of the pipe string 1 and 2 are composed of separate pipe sections. These pipe sections are made in a known manner out of fiberglass reinforced material. The pipe sections of each pipe string are positively connected by coupling means 3. The individual pipe sections as well as the coupling means are reinforced along at least one peripheral line in the axial direction of fibers which absorb the entire load and which thus keep the longitudinal expansion to a minimum. Furthermore, this longitudinal reinforcement also maintains the relationship between the axial expansion to the radial expansion, caused by the internal and external pressure conditions as well as by the dead weight of the string, to less than 0.95, and preferably to less than 0.8. There is furthermore provided in the embodiment of FIG. 1 a cement mixture 4 which serves to cement into place the exterior pipe string 1 in the bore hole 5. In order to facilitate this cementing into place, the exterior pipe string 1 is provided with a sand layer on its exterior surface. This cement mixture is introduced into the annular space between the exterior pipe string 1 and the interior pipe string 2 and then is, by means of a rinsing liquid under pressure, pushed from below upwardly into the annular space between the exterior surface of the exterior pipe strand 1 and the surface of the bore hole 5.

Figure 2:
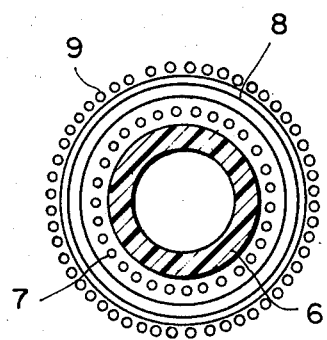
FIG. 2 is a cross-sectional view of an individual pipe section of the arrangement according to FIG. 1, shown on an enlarged scale.

In FIG. 2 there is illustrated schematically a crosssection of a single pipe section of the arrangement of this invention according to FIG. 1. In this schematic illustration the reference numeral 6 designates the interior base resin layer. The reference numeral 7 designates the longitudinal axial reinforcement which is disposed along at least one peripheral line. The reference numeral 8 designates the radial reinforcement which surrounds along two peripheral lines the longitudinal axis reinforcement and reference numeral 9 designates a further reinforcement in the axial direction which is disposed along a peripheral line surrounding the exterior radial reinforcement.

Figure 3:
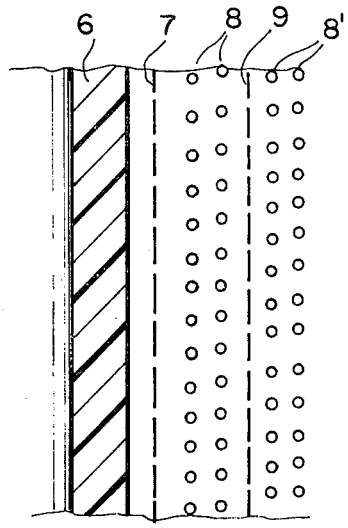
FIGS. 3, to, 6 incl., are schematic representations of wall sections, produced by means of different winding processes, of pipe sections as shown in FIG. 1.

FIGS. 3 to 6 illustrate cross-sectional views of wall portions of pipe sections illustrating schematically alternative embodiments of reinforcements of the individual pipe sections. In FIGS. 3 to 6 the reference numeral 6 illustrates the base resin layer which can be covered with either an organic or inorganic liner. The reference numerals 7 and 9 designate respectively radial inner and radial outer axial reinforcements. The reference numeral 8 designates two radial reinforcements which completely surround the pipe section and between which one axial reinforcement is disposed. In FIG. 3 there is disclosed a special embodiment in which the most radially outwardly disposed axial reinforcement 9 is covered by two additional peripheral radial reinforcements 8. This feature can also be found in the embodiments of FIGS. 4 to 6.

Figure 4:
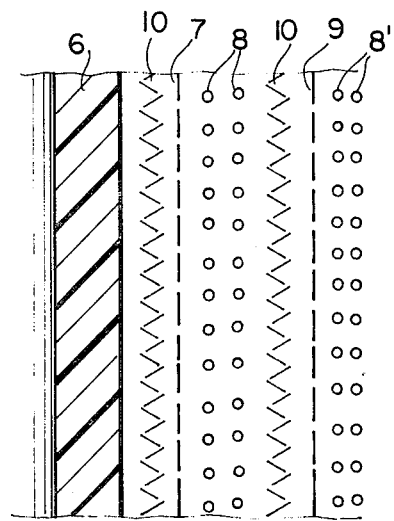
Figure 5:
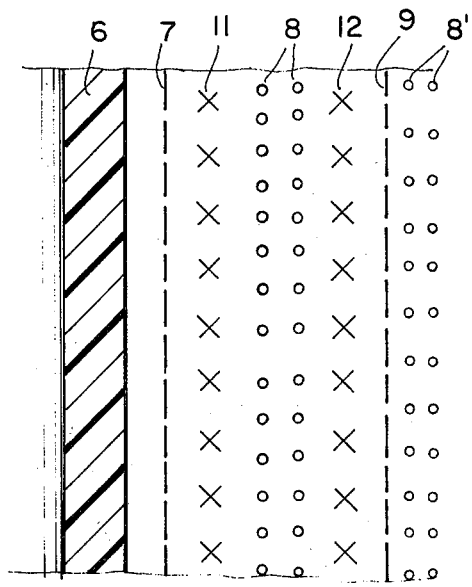

In FIG. 4 there is shown an embodiment wherein there underlies a reinforcing mat or webbing 10 respectively at the axial reinforcements 7 and 9. In the embodiment of FIG. 5 the radial reinforcement 8 is covered at opposite sides by the cross windings 11 and 12 which are disposed between the axial reinforcements 7 and 9. The winding angle of these cross-windings 11 and 12 ranges between 10° to 80°. If occasion arises the cross-winding 12 is wound at a different winding angle than the cross-winding 11.

Figure 6:
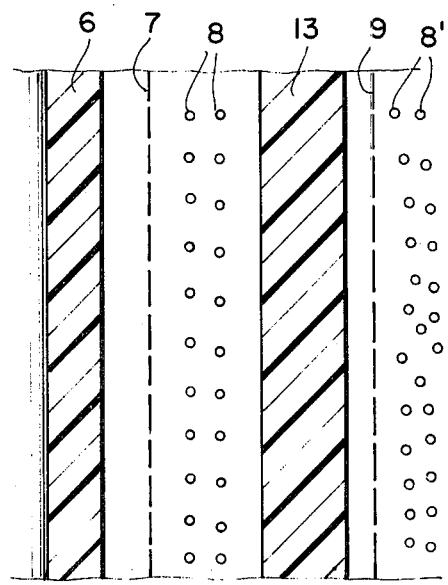

Finally there is shown in the embodiment of FIG. 6 that, for example, the radially most exterior axial reinforcement 9 may have an underlying layer 13 consisting of a mixture of filler material and resin. By using such a mixture, one can economize the amount of glass fibers required for the pipe section and, nevertheless, obtain a high strength in particular a high resistance to external pressure.

Figure 7:
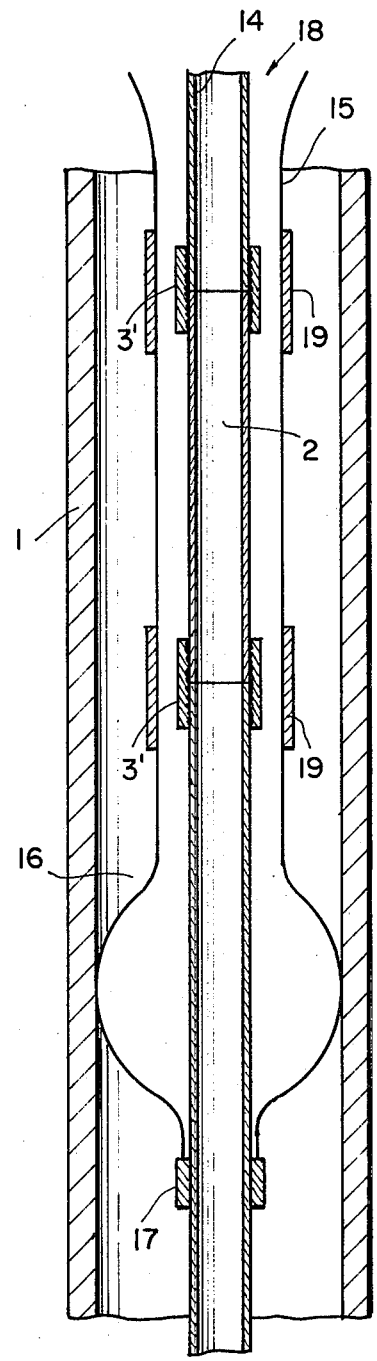
FIG. 7 is a schematic side cross-sectional view of an alternate embodiment of a deep-well drilling arrangement in accordance with this invention.

There is illustrated in FIG. 7 an alternate embodiment of the deep-well drilling arrangement in accordance with this arrangement wherein the inner pipe string consists of a double-walled pipe. Thus the inner pipe string consists of pipe sections having a stiff inner pipe wall which is connected to the adjoining inner pipe section by means of positive coupling means 3'. The inner pipe sections further include an outer wall which is elastic in certain regions, for example, in the region 16. By expanding the outer wall 15 of the inner pipe sections it is possible to obtain a seal between the outer pipe section 1 and the inner pipe section. Once such a seal is made between the outer surface of the inner pipe section and the inner surface of the outer pipe section 1 then, by observing the pressure conditions in the annular space situated between the inner and outer pipe strands, it is possible to determine whether any leakage exists in the pipe string. Thus, it is possible to check the arrangement against leakage as the installation thereof progresses and also after the entire arrangement is in place. The exterior wall of the double-walled inner pipe can, for example, be formed as an elastic hose which surrounds the inner wall of the inner pipe strand. This elastic hose is thinner, i.e., more elastic, in those regions which form the aforementioned seal. The individual hose section may be welded to each other by means of welds 19 as is shown in FIG. 7.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A deep-well drilling arrangement, wherein an outer and inner pipe string are coaxially arranged in a bore hole, the improvement comprising, a first plurality of axially and peripherally fiber glass reinforced pipe sections coaxially positively coupled to each other by first coupling means as to form said outer pipe string, a second plurality of axially and peripherally fiber glass reinforced pipe section positively coupled to each other by second coupling means forming said inner pipe string, a longitudinal fiber layer extending around the entire periphery of each pipe section and coupling means and connected to the pipe section and coupling means of which each pipe string is constituted, said longitudinal fiber layer acting as axial reinforcements for the respective entire pipe string, the ratio between the axial expansion of each of the pipe strings and the radial expansion thereof being less than 0.95.

2. A deep-well drilling arrangement, wherein an outer and inner pipe string are coaxially arranged in a bore hole, the improvement as set forth in claim 1, wherein the ratio between the axial expansion of each pipe string and the radial expansion thereof is less than 0.8.

3. A deep-well drilling arrangement, wherein an outer and an inner pipe string are coaxially arranged in a bore hole, the improvement as set forth in claim 1, wherein there is provided radial reinforcement means surrounding completely each pipe string including the region wherein the individual pipe sections are positively coupled to each other.

4. A deep-well drilling arrangement, wherein an outer and an inner pipe string are coaxially arranged in a bore hole, the improvement as set forth in claim 3, wherein the radial reinforcement is disposed radially inwardly in with respect to axis of the pipe string and comprises a web reinforcement underlying the radial reinforcement.

5. A deep-well drilling arrangement, wherein an outer and in inner pipe string are coaxially arranged in a bore hole, the improvement as set forth in claim 4, wherein the individual pipe sections forming said first and second pluralities have at least one side of their wall surfaces cross-windings which support said radial reinforcement means.

6. A deep-well drilling arrangement, wherein an outer and an inner pipe string are coaxially arranged in bore hole, the improvement as set forth in claim 1, wherein each pipe section of said first and second pipe strings comprises a layer consisting of a mixture of filler material and resin.

7. A deep-well drilling arrangement, wherein an outer and an inner pipe string are coaxially arranged in a bore hole, the improvement as set forth in claim 6 wherein said filler material -resin mixture includes sand having a grain size ranging from 0.8 to 2 mm and being present in the mixture in an amount of 70% by weight.

8. A deep-well drilling arrangement, wherein an outer and an inner pipe string are coaxially arranged in a bore hole, the improvement as set forth in claim 7, wherein the individual pipe sections forming the inner and outer pipe strings include a base layer which has an inner and outer liner covered with resin.

9. A deep-well drilling arrangement, wherein an outer and an inner pipe string are coaxially arranged in a bore hole, the improvement as set forth in claim 8 wherein said resin covering said liner consists of epoxy resin mixed with a hardening agent, said epoxy resin having low viscosity.

10. A deep-well drilling arrangement, wherein an outer and an inner pipe string are coaxially arranged in a bore hole, the improvement as set forth in claim 9, wherein the base layer of the individual pipe sections and the coupling means are provided with a radially inner and a radially outer axial reinforcement, said radial outer axial reinforcement having two peripheral radial reinforcements.

11. A deep-well drilling arrangement, wherein an outer and an inner pipe string are coaxially arranged in a bore hole, the improvement as set forth in claim 10, wherein at least one axial reinforcement is disposed between the radial reinforcements and at least one cross-winding is disposed between each axial and each radial reinforcement.

12. A deep-well drilling arrangement, wherein an outer and an inner pipe string are coaxially arranged in a bore hole, the improvement as set forth in claim 11, wherein the cross-winding is wound with an angle ranging from 10° to 80°.

13. A deep-well drilling arrangement, wherein an outer and an inner pipe string are coaxially arranged in a bore hole, the improvement as set forth in claim 12, wherein the cross-windings are wound with different angles.

14. A deep-well drilling arrangement, wherein an outer and an inner pipe string are coaxially arranged in a bore hole, the improvement as set forth in claim 13, wherein the base layer of the individual pipe sections and their coupling means include fibers of different thickness.

15. A deep-well drilling arrangement, wherein an outer and an inner pipe string are coaxially arranged in a bore hole, the improvement as set forth in claim 1, wherein the individual pipe sections and their coupling means have wall thicknesses which decrease in an axial direction from the top to the bottom of the bore hole.

16. A deep-well drilling arrangement, wherein an outer and an inner pipe string are coaxially arranged in a bore hole, the improvement as set forth in claim 15, wherein the inner pipe string is formed of double-walled pipe sections thus forming a double-walled inner pipe string which has an outer pipe wall radially spaced from an inner pipe wall, said outer pipe wall having portions which are elastic, said portions being adapted to be moved radially outwardly until they come into contact with the outer pipe string thereby sealing the annular space defined between said inner and outer pipe string which is situated below the sealing area.

17. A deep-well drilling arrangement, wherein an outer and an inner pipe string are coaxially arranged in a bore hole, the improvement as set forth in claim 16, wherein the elastic portions of the outer wall of the double-walled inner pipe string are formed as an elastic hose which surrounds the iner pipe string.

18. A deep-well drilling arrangement, wherein an outer and an inner pipe string are coaxially arranged in a bore hole, the improvement as set forth in claim 13, wherein the inner wall of the double-walled inner pipe string is surrounded by said elastic hose along its entire length and the portions which are elastic are formed by said elastic hose, said portions having a thinner wall thickness than the remainder of said elastic hose.

19. A deep-well drilling arrangement, wherein an outer and an inner pipe string are coaxially arranged in a bore hole, the improvement as set forth in claim 18, wherein the exterior surface of the exterior pipe string is covered with a layer of sand.

* * * * *